United States Patent
Tuan

[19]

[11] Patent Number: 5,597,175
[45] Date of Patent: Jan. 28, 1997

[54] REAR SUSPENSION SYSTEM OF A MOTOR VEHICLE

[75] Inventor: Pham A. Tuan, Elancourt, France

[73] Assignee: SOLLAC, Puteaux, France

[21] Appl. No.: 454,217

[22] PCT Filed: Nov. 14, 1994

[86] PCT No.: PCT/FR94/01325

§ 371 Date: Jul. 31, 1995

§ 102(e) Date: Jul. 31, 1995

[87] PCT Pub. No.: WO95/13931

PCT Pub. Date: May 26, 1995

(Under 37 CFR 1.47)

[30] Foreign Application Priority Data

Nov. 16, 1993 [FR] France ................... 93 13658
Apr. 5, 1994 [FR] France ................... 94 03992

[51] Int. Cl.⁶ ........................................... B60G 11/18
[52] U.S. Cl. ........................................... 280/723; 280/689
[58] Field of Search ............................. 280/689, 721, 280/723

[56] References Cited

U.S. PATENT DOCUMENTS

| | | | |
|---|---|---|---|
| 3,767,224 | 10/1973 | Schneeweiss | 280/723 |
| 3,951,225 | 4/1976 | Schwenk | 280/689 |
| 4,165,099 | 8/1979 | Wagner et al. | 280/708 |
| 4,232,881 | 11/1980 | Kolbel et al. | 280/721 |
| 4,486,030 | 12/1984 | Takata et al. | 280/689 |
| 4,625,995 | 12/1986 | Aubry et al. | 280/723 |

FOREIGN PATENT DOCUMENTS

| | | |
|---|---|---|
| 0156705 | 10/1985 | European Pat. Off. . |
| 2269429 | 11/1975 | France . |
| 2591155 | 6/1987 | France . |
| 2425740 | 12/1975 | Germany . |
| 5-69714 | 3/1993 | Japan ................... 280/723 |

*Primary Examiner*—Paul N. Dickson
*Attorney, Agent, or Firm*—Cushman Darby & Cushman IP Group of Pillsbury Madison & Sutro LLP

[57] ABSTRACT

The rear set of wheels of a motor vehicle comprises a U- or H-shaped axle, formed by two suspension arms (2) interconnected by an omega-section beam (7). Each suspension arm is constituted by at least one metal plate (1) and a lateral flange (8) welded together and to the beam (7), the plate (1) having, in at least a part of its length, a width which varies by increasing from the rear toward the front in accordance with a substantially parabolic function.

10 Claims, 4 Drawing Sheets

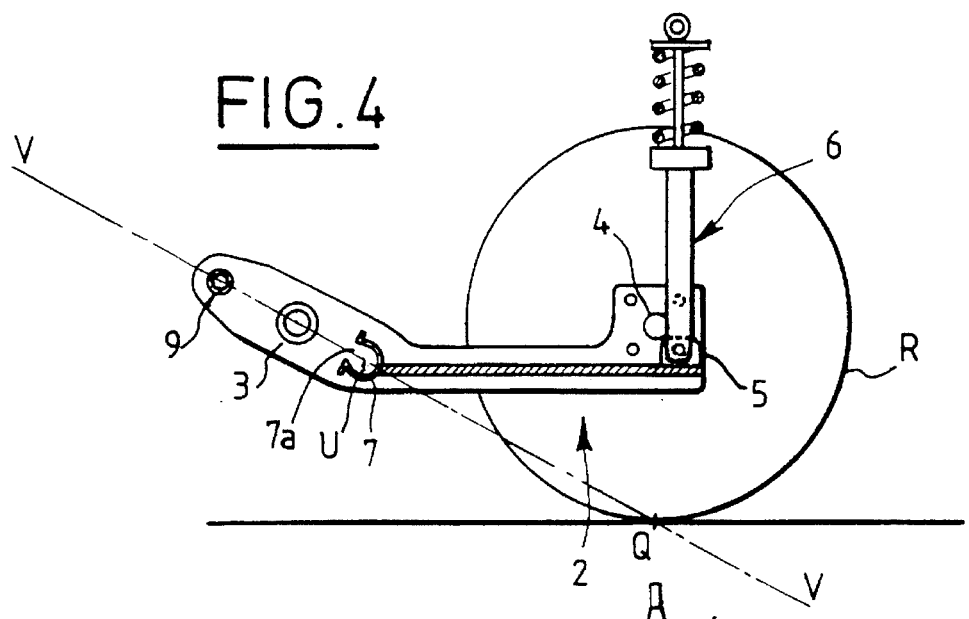

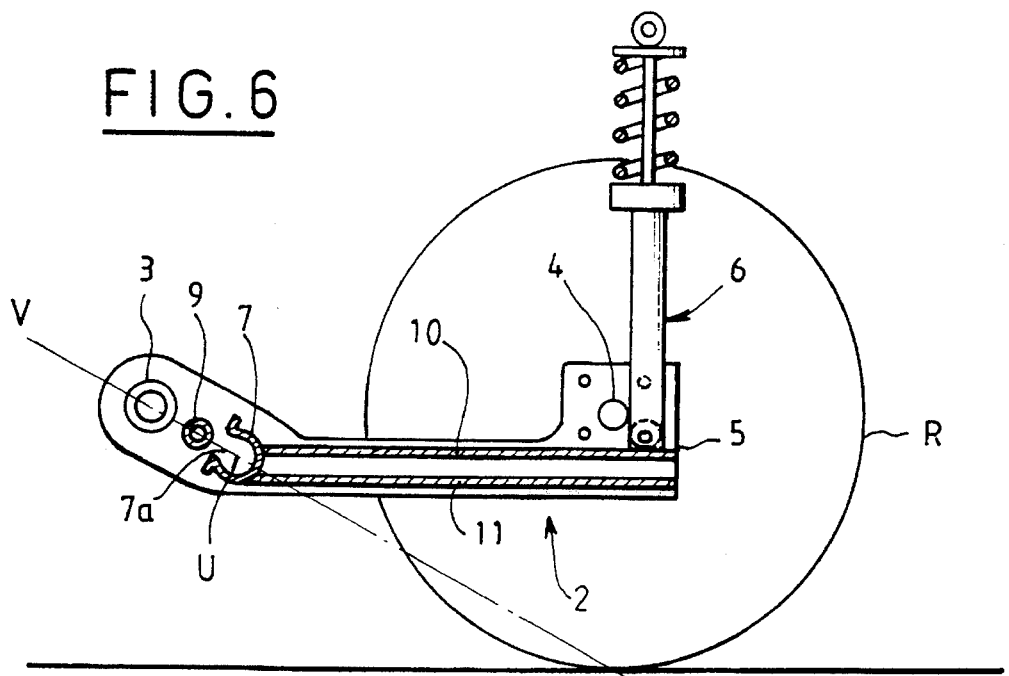
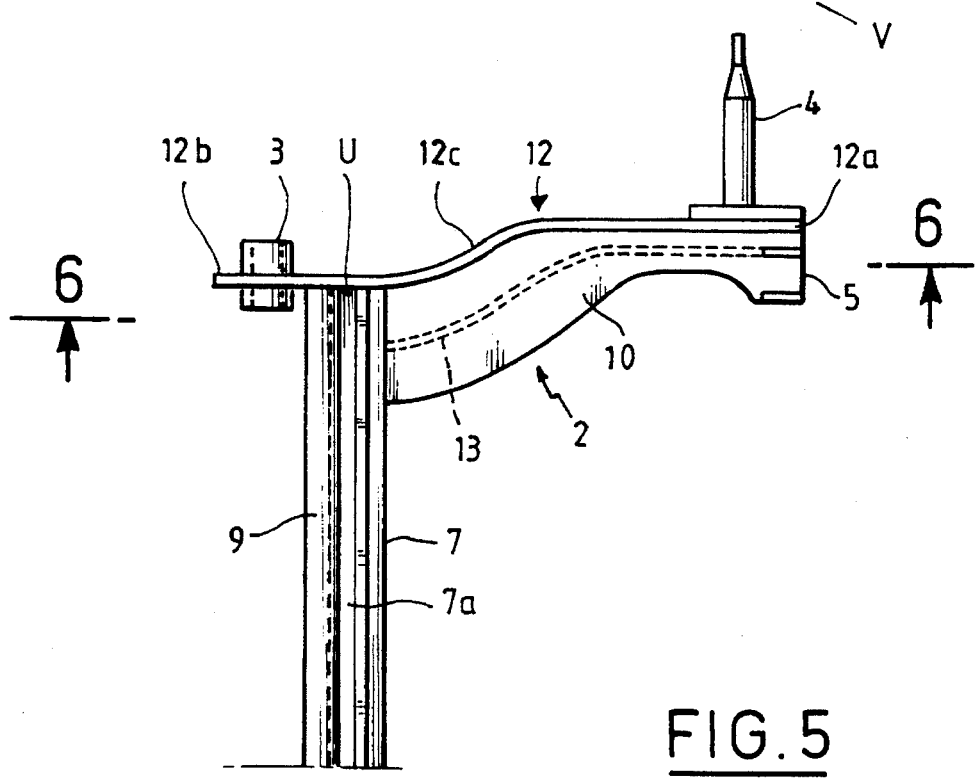

REAR SUSPENSION SYSTEM OF A MOTOR VEHICLE

The present invention concerns rear axles of motor vehicles and their suspension devices.

More precisely, it relates to a U- or H-shaped axle, termed semi-rigid axle, of the type comprising two longitudinal suspension arms each carrying a wheel stub axle, connected by a transverse beam which constitutes the transverse branch of the H or U and has an open section the opening of which faces toward the front of the vehicle, this axle being connected to the suspended part of the vehicle by elastic articulations and by struts each comprising a damper and a coil spring disposed concentrically, of which the respective points of attachment to the suspension arms are close to the wheel stub axles.

In its principle, such an axle aims to cause a part of the function of elasticity of the suspension to be performed by a flexible structure comprising the two suspension arms and the open-section transverse beam which is principally subjected to torsional stress. This type of axle affords high rigidity with respect to the transverse and longitudinal forces while remaining relatively flexible in torsion.

An axle is known which has the general shape of a U or H and possesses high rigidity with respect to lateral skid, i.e. with respect to a transverse force exerted on the rear wheels. This axle comprises two tubular suspension arms resisting bending and interconnected by a beam welded at the end, reinforcements being provided in the region of connection between the suspension arms and this beam. The transverse beam is constituted by a section member having an open section while the tubular suspension arms may be made in the form of two semi-shells welded together.

Such an axle has the drawback of being only slightly rigid in the zone of transmission between the suspension arm and the transverse beam, which requires the presence of reinforcing press-formed members on the tubular arms. Further, the manufacture of such arms is of relatively high cost and the arms are a source of problems of corrosion resulting from their welded construction and their tubular shape.

An object of the invention is to propose a rear set of wheels of a vehicle, of the type comprising an H- or U-shaped axle which is of simpler construction and does not have the drawbacks of the known arrangements while being capable of resisting the various mechanical stresses encountered.

For this purpose, a rear set of wheels comprising an axle of the previously-defined type is characterized in that each suspension arm comprises at least one metal plate fixed in its front part to the transverse beam and carrying in its rear part the wheel stub axle and the attachment of the strut, this plate having, in at least a part of its length, a width which increases from a rear part toward a front part, substantially in accordance with a substantially parabolic function.

According to other characteristics:

—each suspension arm comprises a metal plate and a metal lateral flange perpendicular to the plate and extending along the outer edge of the latter, this lateral flange carrying an element for the articulation to the suspended part of the vehicle and the wheel stub axle;

—each suspension arm comprises two substantially parallel metal plates fixed in their front part to the transverse beam and carrying in their rear part the wheel stub axle and the attachment of the wheel strut, a metal lateral flange perpendicular to the plates and extending along the outer edge of the latter, and at least one metal intermediate flange fixed between and perpendicular to the plates and extending throughout the length of these plates, said plates having, in at least a part of their length, a width which varies by increasing from a rear part toward a front part, in accordance with a substantially parabolic function, and said lateral flange and said intermediate flange forming a box structure connected to the transverse beam;

—each suspension arm comprises two metal intermediate flanges fixed between and perpendicular to the plates and extending throughout the length of these plates, these intermediate flanges and the lateral flange forming two box structures connected to the transverse beam;

—each suspension arm comprises two press-formed sheets forming two U-section members fitted one inside the other, the flanges of the section members having, in at least a part of their length, a width which varies by increasing from a rear part toward a front part in accordance with a substantially parabolic function;

—the inner end of the outer section member forms a lateral flange carrying an element for the articulation to the suspended part of the vehicle, and the wheel stub axle;

—the flanges of the inner section member have a width less than the flanges of the outer section member;

—the free ends of the flanges of the section members are placed edge to edge and the inner end of the inner section member and the inner end of the outer section member form a box structure connected to the transverse beam;

—the lateral flange has a generally S-shape and comprises two substantially planar end parts and a curved intermediate part;

—the transverse beam and the element for the articulation to the suspended part are fixed to the front end part of the lateral flange;

—the transverse beam is an omega-section member of which the plane of symmetry passes substantially through the points of contact between the wheels of the set of wheels and the ground.

The invention will be described in more detail hereinafter with reference to the accompanying drawings given solely by way of example and in which:

FIGS. 1A and 1B are diagrams illustrating the distribution of the mechanical stresses in the suspension arm respectively as a function of a transverse force due to lateral skid (FIG. 1A) and a longitudinal force due to braking (FIG. 1B);

FIG. 2 diagrammatically represents optimized suspension arms;

FIG. 3 is a top plan view of an H-type axle according to the invention;

FIG. 4 is a sectional view taken on the line 4—4 of FIG. 3;

FIG. 5 is a semi-plan view of an axle of H-type according to another embodiment of the invention;

FIG. 6 is a sectional view taken on line 6—6 of FIG. 5, and FIGS. 7A to 7C are diagrammatic cross-sectional views of various embodiments of suspension arms.

The association of a suspension arm which is rigid with respect to bending and torsion with a beam which resists bending but is relatively flexible in torsion results in high stresses in the parts of connection between the arm and the beam under the combined effect of the torsion and bending moments. The problem of the resistance to these stresses to which an axle is subjected is difficult to resolve.

An axle of the "semi-rigid" type which is part of a rear set of wheels of a motor vehicle must perform two principal functions:

—guide the set of wheels;

Consequently, the structure must afford good resistance to the horizontal forces coming from the contacts of the wheels with the ground, i.e. the lateral skid and braking forces;

—afford rigidity as concerns roll.

Consequently, the structure of the axle must exhibit sufficient flexibility in the course of the relative anti-symmetrical movements of the wheels while being neutral with respect to movements of said wheels which are substantially symmetrical relative to the median vertical plane of the vehicle.

It has been moreover observed that such an axle substantially does not support the suspended mass, since the vertical force passes directly through the strut bearing in the vicinity of the wheel.

Figure 1A:
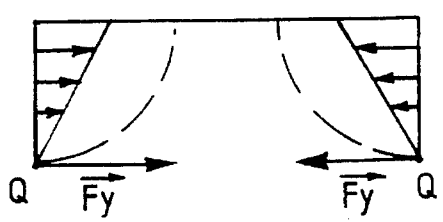

As shown in FIG. 1A, under the effect of the forces from the wheel-ground contact in the case of lateral skid where the forces are transverse (for example in a bend), said forces by applied at the point of contact Q between the wheel and the ground give rise to bending moments which increase linearly from the rear end of the arm to its fixture to the beam. It is desirable in such a case to arrange that the section of the arm have, owing to the "isostress", a substantially parabolic profile.

Figure 1B:
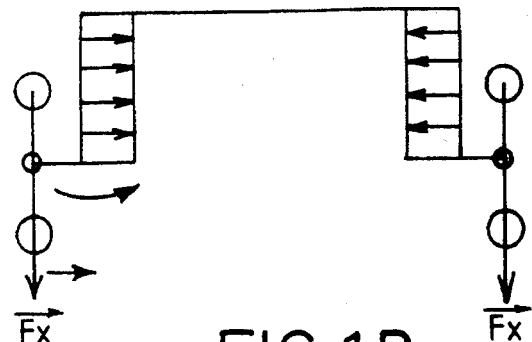

In the case of a longitudinal force, for example when braking, as shown in FIG. 1B, the forces Fx applied to the suspension arm give rise to substantially constant bending moments.

Figure 2:
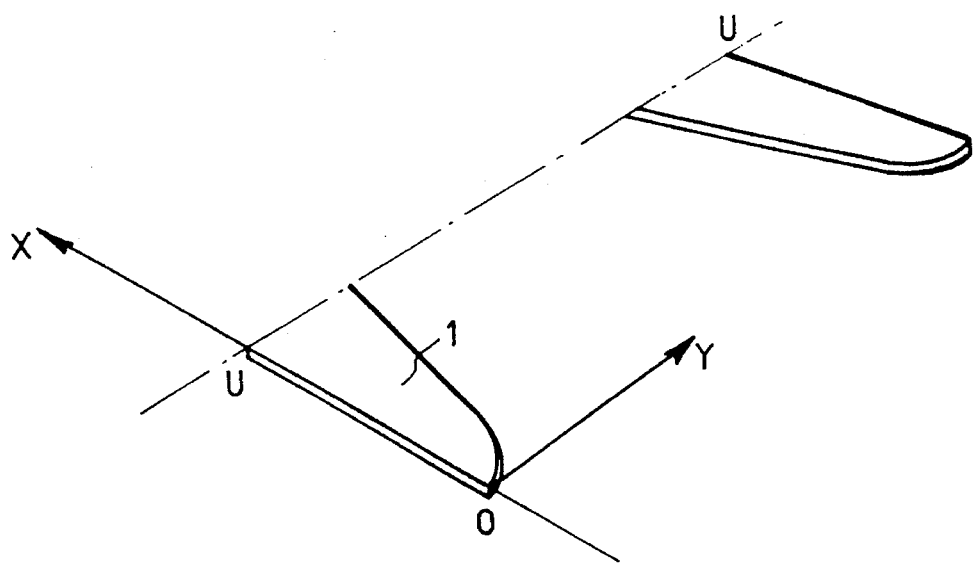

As there is no vertical force to be withstood, the optimized shape of the arm is, as shown in FIG. 2, a substantially horizontal plate 1 having a parabolic profile of which the axis of symmetry OX is perpendicular to the wheel axis OY and to the longitudinal axis U—U of the beam, the apex of the parabola being located adjacent to the wheel axis.

FIG. 3 is a rather diagrammatic plan view of a rear axle according to the invent ion, comprising two substantially parallel suspension arms 2 each carrying a shell 3 for the attachment of the axle to the suspended structure of the vehicle, a stub axle 4 of a wheel R, an attachment 5 for a strut 6, and a transverse beam 7 interconnecting the suspension arms 2. The beam 7 is a section member having an open section and its opening 7a faces toward the front of the vehicle.

According to the invention, each arm 2 comprises at least one plate 1 and a lateral flange 8 substantially perpendicular to the plate 1, welded together, on which are fixed the shell 3, the stub axle 4, the attachment 5 and the beam 7.

The latter must afford maximum resistance to bending under the effect of lateral skid forces (transverse, horizontal forces) exerted in the region of the surface of contact between the wheel and the ground represented by the point Q (FIG. 4).

For this purpose, the beam 7 has preferably an omega-section the orientation of which is such that its plane of symmetry V—V passes substantially through the point Q.

The beam must also exhibit a low torsional rigidity, at least just necessary to perform the anti-roll function of the axle.

The open section, as shown for an omega-section, permits reducing the torsional rigidity. The opening of the section facing toward the front of the vehicle has for purpose to avoid buckling of the section member under the effect of lateral skid forces.

In the embodiment shown in FIGS. 3 and 4, the lateral flange 8 has the shape of a flattened S with two substantially rectilinear end parts 8a, 8b and a curved intermediate part 8c located to the rear of the omega-section beam 7. Disposed between the two front ends 8b of the two lateral flanges 8 is an anti-roll bar 9 which may be solid but is preferably tubular. The shells 3 for the articulation to the suspended part of the vehicle are also disposed on the lateral flanges 8.

Bearing in mind the complex shape of the outer edge of the plate 1 adjacent to the lateral flange 8, the inner edge of this plate does not have a purely parabolic shape. It may be merely considered that, in a portion roughly corresponding to the front two-thirds of this plate, it has a width which varies substantially in accordance with a parabolic function. This of course assumes that the plate has a constant thickness.

It will be observed that the anti-roll bar 9 enhances the guiding function of the suspension device. Indeed, it affords this device an increased rigidity, in particular with respect to transverse skid forces.

This bar participates in the torsional rigidity of the axle, it provides greater possibility of adjustment of the torsional and bending characteristics, on one hand, as a function of its specific characteristics and, on the other hand, as a function of its position relative to the articulation of the axle on the structure of the vehicle.

Preferably, the front part of the lateral S-shaped flange 8 rises in the direction upwardly and forwardly of the vehicle as can be seen in FIG. 4 and the axes of the articulation shells and of the anti-roll bar are contained in the plane of symmetry V—V of the beam 7.

The beam 7 and the bar 9, disposed on opposite sides of the articulation 3 and preferably at the same distance from the latter, are subjected to equal torsions in opposite directions. In an alternative embodiment, the bar 7 and the beam 9 may be placed on the same side of the articulation 3.

Figure 7A:
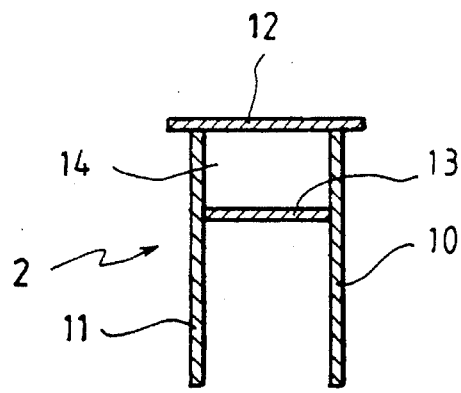

In another embodiment shown in FIGS. 5, 6 and 7A, each suspension arm 2 comprises, on one hand, two substantially parallel metal plates 10 and 11 fixed in their front part to the transverse beam 7 and carrying in their rear part the wheel stub axle 4 and the attachment 5 of the strut 6 and, on the other hand, a metal lateral flange 12 perpendicular to the plates 10 and 11 and extending along the outer edge of the latter.

Further, each suspension arm 2 comprises a metal intermediate flange 13, for example fixed by welding, between and perpendicular to the plates 10 and 11. The intermediate flange 13 extends throughout the length of said plates 10 and 11. The lateral flange 12 and the intermediate flange 13 form a box structure 14 having a substantially rectangular section and connected to the transverse beam 7.

The plates 10 and 11 also have, in at least a part of their length, a width which varies by increasing from a rear part toward a front part in accordance with a substantially parabolic function.

Figure 7B:
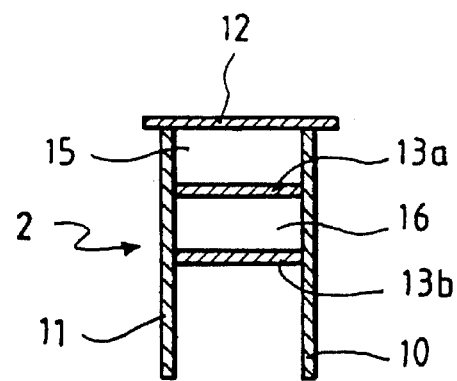

According to yet another embodiment shown in FIG. 7B, each suspension arm 2 comprises two metal intermediate flanges 13a and 13b, for example fixed by welding, between and perpendicular to the plates 10 and 11. These intermediate flanges 13a and 13b form two box structures, respectively 15 and 16, having substantially rectangular sections and connected to the transverse beam 7. The lateral flange 12 has a flattened S-shape with two substantially rectilinear end parts 12a and 12b and a curved intermediate part 12c located to the rear of the omega-section beam 7. The shells 3 for the articulation to the suspended part of the vehicle are also disposed on the lateral flanges 12.

The anti-roll bar 9 is located between the two front ends 12b of the two lateral flanges 12 and between the articulation shells 3 and the omega-section beam 7.

Preferably, the front part of the lateral S-shaped flange 12 rises upwardly and forwardly of the vehicle as shown in FIG. 6 and the axes of the articulation shells and the anti-roll bar are contained in the plane of symmetry V—V of the beam 7.

Figure 7C:
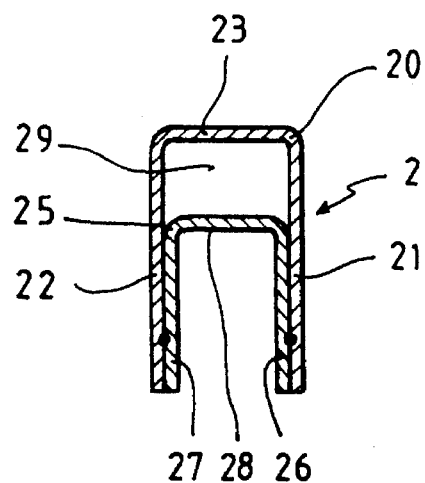

According to another embodiment shown in FIG. 7C, each suspension arm 2 comprises two press-formed sheets forming two U-section members 20 and 25 fitted one inside the other. The two section members 20 and 25 are fixed to each other for example by welding.

The flanges 21, 22 and 26, 27 have, in at least a part of their length, a width which varies by increasing from a rear part toward a front part in accordance with a substantially parabolic function.

The inner end 23 of the outer section member 20 constitutes a lateral flange identical in shape to the lateral flanges of the preceding embodiments carrying the element 3 for the articulation to the suspended part of the vehicle, the omega-section beam 7 and the anti-roll bar 9.

Preferably, the flanges 26 and 27 of the inner section member 25 have a width less than the flanges 21 and 22 of the outer section member 20 and the free ends of the flanges 21, 22 and 26, 27 of the section members 20 and 25 are placed edge to edge.

The inner end 23 of the outer section member 20 and the inner end 28 of the inner section member 25 form a box structure 29 having a substantially rectangular section and connected to the transverse beam 7.

I claim:

1. A rear suspension system for a motor vehicle comprising:

an axle assembly comprising:
two longitudinal suspension arms, each suspension arm carrying a wheel stub axle and having a strut attachment portion near an associated wheel stub axle,
a transverse beam interconnecting said suspension arms and having an open section, an opening of said open section facing towards a front of the vehicle,
elastic articulations carried by each of said suspension arms constructed and arranged to attach said axle to the vehicle, and
a pair of struts, each strut being coupled to an associated strut attachment portion and being constructed and arranged to be attached to the vehicle, and
a pair of wheels, one wheel of the pair being mounted on an associated wheel stub axle,
wherein each said suspension arm comprises:
two substantially parallel metal members having front and rear portions, said front portions being fixed to said transverse beam, said rear portions carrying said wheel stub axles and defining said strut attachment portions,
a lateral metal flange disposed generally perpendicularly to said metal members and joining said metal members, and
at least one intermediate flange fixed between and perpendicular to the metal members and extending generally a length of said metal members,
said metal members having in at least a portion of a length thereof, a width which varies, said width increasing from the rear portion towards the front portion in accordance with a substantially parabolic shape,
said lateral flange and said intermediate flange together with at least a portion of said metal members forming a box structure connected to said transverse beam.

2. The rear suspension according to claim 1, wherein two metal intermediate flanges are fixed between and perpendicular to the metal members and extend throughout the length of the metal members, said intermediate flanges and the lateral flange together with at least a portion of the metal members forming two box structures connected to the transverse beam.

3. The rear suspension according to claim 1, wherein each suspension arm comprises two press-formed sheets forming first and second U-shaped members, the second U-shaped member being fitted inside the first U-shaped member, said first U-shaped member having a portion defining said lateral flange and said second U-shaped member having a portion defining said intermediate flange, each of said U-shaped members including a pair of elongated flanges defining said metal members, each of said elongated flanges having, in at least a portion of a length thereof, a width which varies by increasing from the rear portion towards the front portion in accordance with a substantially parabolic shape.

4. The rear suspension according to claim 3, wherein an inner end of the first U-shaped member forms said lateral flange.

5. The rear suspension according to claim 3, wherein the elongated flanges of the second U-shaped member have a width less than the elongated flanges of the first U-shaped member.

6. The rear suspension according to one of claims 3–5, wherein each of said elongated flanges has a free end, all free ends being placed edge to edge and an inner end of the second U-shaped member and an inner end of the first U-shaped member form said box structure together with the elongated flange of the first U-shaped member.

7. The rear suspension according to claim 1, wherein the transverse beam is in the form of a Ω-shaped member having a plane of symmetry which passes substantially through points of contact between the wheels and the ground.

8. The rear suspension according to claim 7, wherein the plane of symmetry of the transverse beam passes substantially through an axis of the articulations.

9. A rear suspension system for a motor vehicle comprising:

an axle assembly comprising:

two longitudinal suspension arms, each suspension arm carrying a wheel stub axle and having a strut attachment portion near an associated wheel stub axle, a transverse beam interconnecting said suspension arms and having an open section, an opening of said open section facing towards a front of the vehicle, elastic articulations carried by each of said suspension arms constructed and arranged to attach said axle to the vehicle, and a pair of struts, each strut being coupled to an associated strut attachment portion and being constructed and arranged to be attached to the vehicle, and a pair of wheels, one wheel of the pair being mounted on an associated wheel stub axle, wherein each said suspension arm comprises:

two press-formed sheets forming first and second U-shaped members, the second U-shaped member being fitted inside said first U-shaped member, each of said U-shaped members including a pair of elongated flanges, each of said elongated flanges having, in at least a portion of a length thereof, a width which varies by increasing from a rear portion thereof towards a front portion thereof in accordance with a substantially parabolic shape.

10. A rear suspension system for a motor vehicle comprising:

an axle assembly comprising:

two longitudinal suspension arms, each suspension arm carrying a wheel stub axle and having a strut attachment portion near an associated wheel stub axle, a transverse beam interconnecting said suspension arms and having an open section, an opening of said open section facing towards a front of the vehicle, elastic articulations carried by each of said suspension arms constructed and arranged to attach said axle to the vehicle, and a pair of struts, each strut being coupled to an associated strut attachment portion and being constructed and arranged to be attached to the vehicle, and a pair of wheels, one wheel of the pair being mounted on an associated wheel stub axle, wherein each said transverse beam is an $\Omega$-shaped member having a plane of symmetry which passes substantially through points of contact between the wheels and the ground.

* * * * *